United States Patent
Michau et al.

(10) Patent No.: US 6,533,703 B2
(45) Date of Patent: Mar. 18, 2003

(54) METHOD FOR CONTROLLING A MOTOR VEHICLE DRIVE AND A MOTOR VEHICLE DRIVE THAT IS CONTROLLED USING THE METHOD

(75) Inventors: Peter Michau, Regensburg (DE); Ernst Nock, Regensburg (DE); Stephan Pindl, Bad Abbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/970,976

(22) Filed: Oct. 4, 2001

(65) Prior Publication Data

US 2002/0042325 A1 Apr. 11, 2002

Related U.S. Application Data

(63) Continuation of application No. PCT/DE00/00346, filed on Feb. 4, 2000.

(51) Int. Cl.$^7$ ............................................... B60K 41/02
(52) U.S. Cl. ........................................................ 477/78
(58) Field of Search ............................................. 477/78

(56) References Cited

U.S. PATENT DOCUMENTS

| | | | | |
|---|---|---|---|---|
| 6,042,503 A | * | 3/2000 | Kosik et al. | 477/78 |
| 6,234,933 B1 | * | 5/2001 | Tornatore | 477/78 |
| 6,250,448 B1 | * | 6/2001 | Salecker et al. | 477/78 |
| 6,389,346 B1 | * | 5/2002 | Gianoglio et al. | 477/78 |
| 2002/0042325 A1 | * | 4/2002 | Michau et al. | 477/97 |

FOREIGN PATENT DOCUMENTS

| DE | 40 11 850 A 1 | 10/1990 |
|---|---|---|
| DE | 198 412 856 C 1 | 12/1999 |
| EP | 0 474 107 A2 | 3/1992 |

OTHER PUBLICATIONS

PCT/DE00/00346 International Search Report, published 2001–08–09.*
(Lecturing Material for Motor Vehicle Technology);R. Gscheidle: "Fachkunde Kraftfahrzeugtechnik" (Subject: Motor Vehicle Technology), vol. 26, 1999, chapter 3.2.5.

* cited by examiner

*Primary Examiner*—Dirk Wright
(74) *Attorney, Agent, or Firm*—Laurence A. Greenberg; Werner H. Stemer; Ralph E. Locher

(57) ABSTRACT

A motor vehicle drive and a method for controlling a motor vehicle drive in which control signals, by reference to which a set position is set, are transmitted from a superordinate controller to a subordinate clutch position controller. An actual position signal is transmitted from the position controller to the controller. A feedback message is transmitted from the controller to the position controller via an efficient interface, and the controlling quality is thus optimized by the position controller in accordance with the respective travel situation.

9 Claims, 7 Drawing Sheets

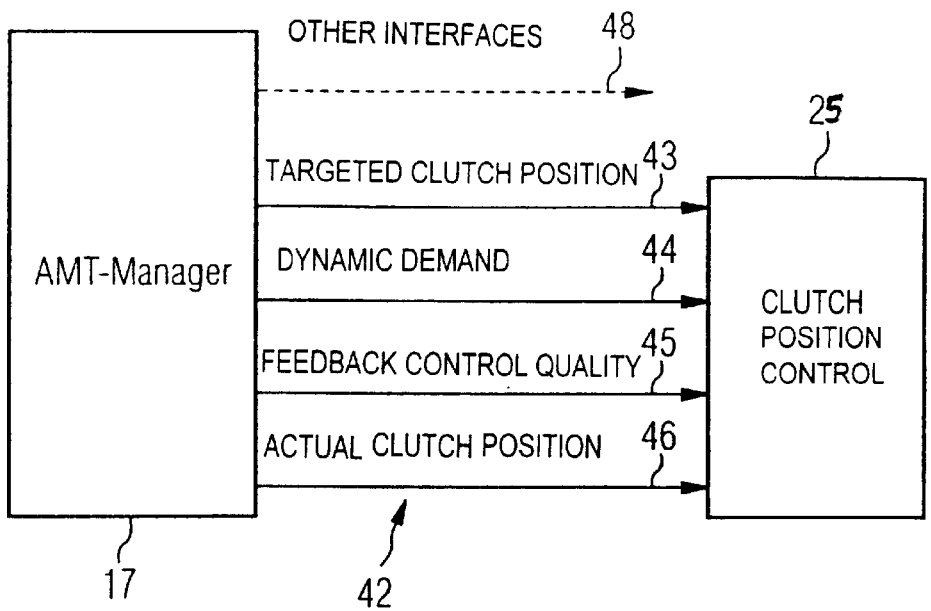
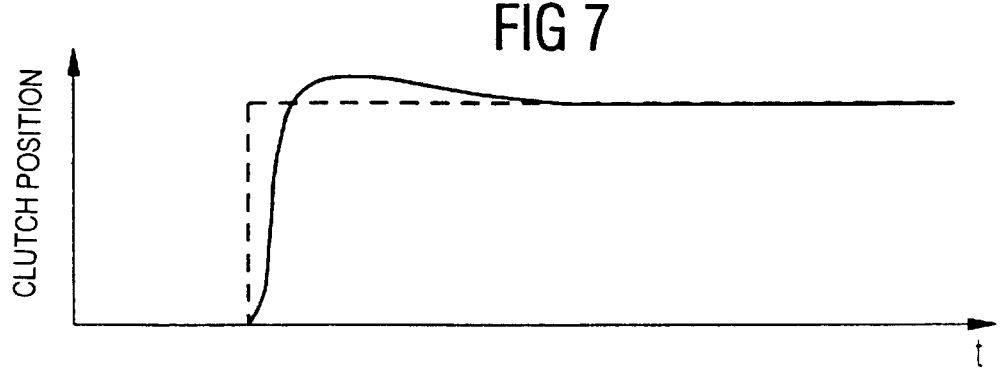
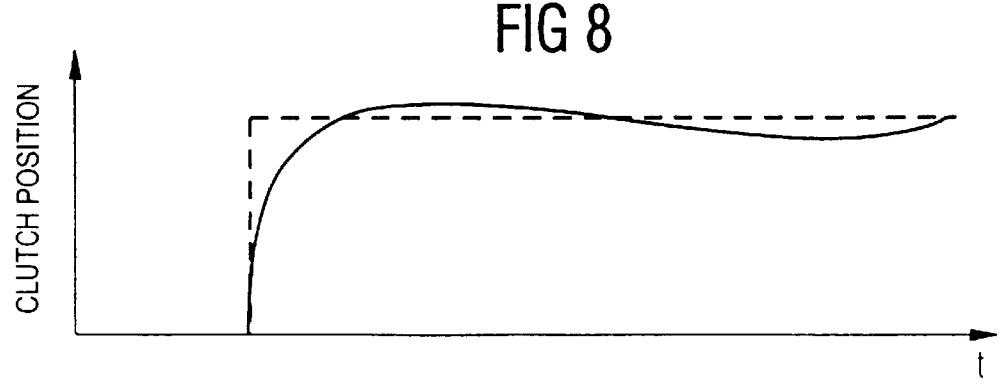

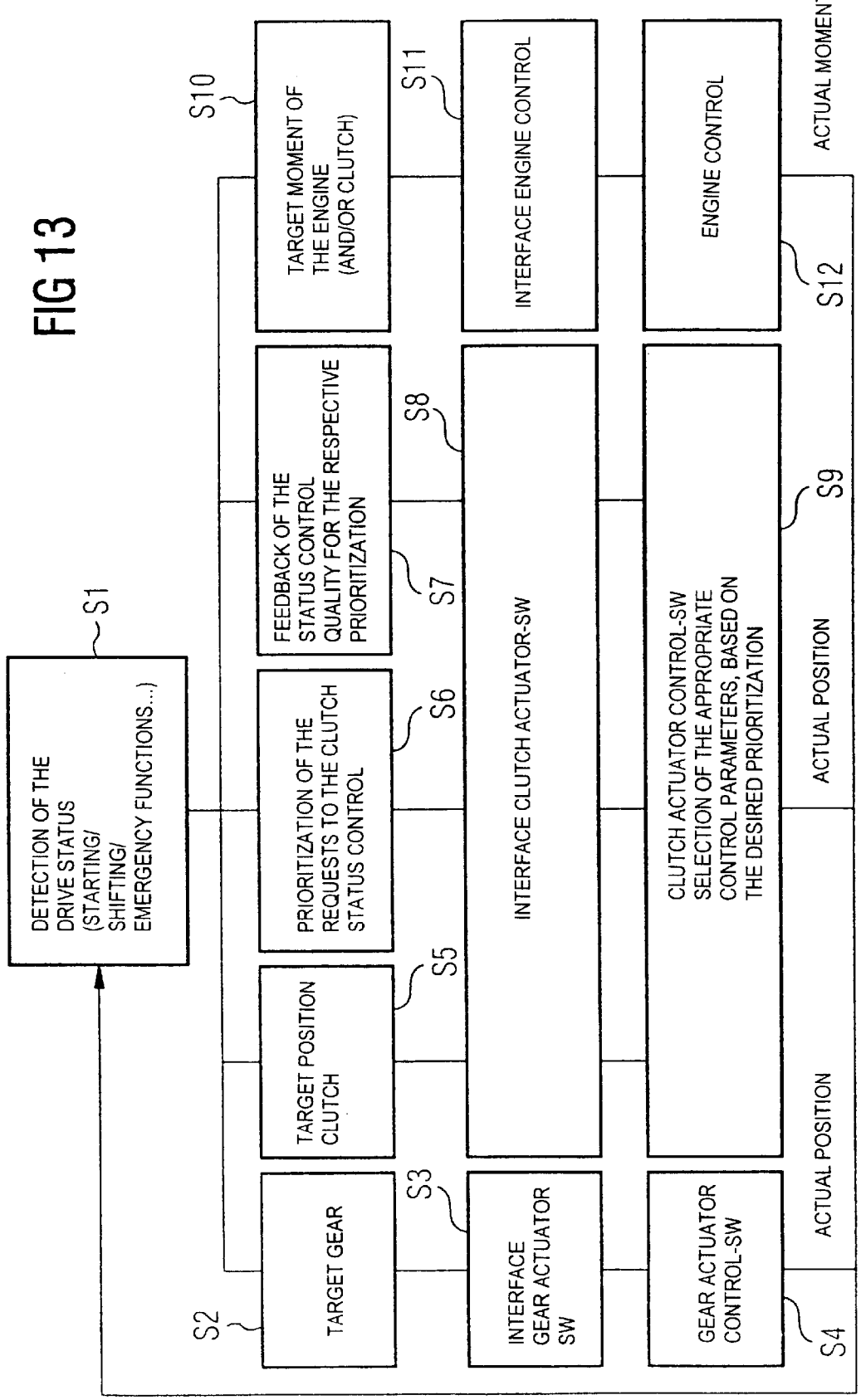

METHOD FOR CONTROLLING A MOTOR VEHICLE DRIVE AND A MOTOR VEHICLE DRIVE THAT IS CONTROLLED USING THE METHOD

CROSS-REFERENCE TO RELATED APPLICATION

This application is a continuation of copending International Application No. PCT/DE00/00346, filed Feb. 4, 2000, which designated the United States.

BACKGROUND OF THE INVENTION

Field of the Invention

The invention relates to a method that is used to control a motor vehicle drive having an automatically activated clutch, an automated transmission, a transmission actuator and an electronic drive controller. In addition, such a motor vehicle drive is provided that is to be controlled using this method.

The basic configuration of a motor vehicle drive with an automatically activated clutch is described in the specialist book Kraftfahrzeugtechnik [Motor vehicle technology], Verlag [publishing house] Europa-Lehrmittel, 26th Edition, 1999, pp. 392–393.

The precise conversion, by a clutch position controller, of a clutch position that is predefined by the control system is very important for a high-quality automated transmission. The main quality criteria in this context are a small interruption in the traction force and the avoidance of disruptive jolting of the vehicle during gear-shift operations.

SUMMARY OF THE INVENTION

It is accordingly an object of the invention to provide a method for controlling a motor vehicle drive such that the quality criteria mentioned above are fulfilled. It is also an object of the invention to provide a motor vehicle drive that can be controlled using the method.

With the foregoing and other objects in view there is provided, in accordance with the invention, a method for controlling a motor vehicle drive, that includes steps of: providing a motor vehicle drive having an automatically activated clutch, an automatic transmission, a transmission actuator, and an electronic drive controller; providing control signals that are used to set a set point; through an interface, transmitting the control signals from a superordinate controller to a subordinate position controller for a clutch; through the interface, transmitting an actual position signal from the subordinate position controller to the superordinate controller; providing a feedback message that is used to optimize a controlling quality as a function of a respective travel situation; and through the interface, transmitting the feedback message from the superordinate controller to the subordinate position controller.

In accordance with an added mode of the invention, the method includes a step of dynamically and individually matching a control operation for a clutch position of the clutch to the respective travel situation.

In accordance with an additional mode of the invention, the method includes a step of using the controlled quantity that has been optimized in order to define different priorities for dynamics of a controlling operation.

In accordance with another mode of the invention, the method includes a step of using the controlled quantity that has been optimized in order to define different priorities for a steady-state precision of a controlling operation.

In accordance with a further mode of the invention, the method includes a step of using the controlled quantity that has been optimized to define a permitted magnitude of controlling overshoots.

In accordance with a further added mode of the invention, the method includes a step of using the superordinate controller to coordinate control operations of the motor vehicle drive for predefined travel situations.

With the foregoing and other objects in view there is provided, in accordance with the invention, a motor vehicle drive, that includes: an automatically activated clutch; an automatic transmission; a transmission actuator; an electronic drive controller that includes a superordinate controller and a subordinate position controller for the clutch; and an interface that is provided between the superordinate controller and the subordinate position controller. The interface is provided for exchanging control signals and status signals that are used to optimize a controlling quality as a function of a respective travel situation.

In accordance with an added feature of the invention, there is provided: an actuator control system that is connected to the superordinate controller by the interface; a transmission controller; and data lines connecting the actuator control system to the transmission controller.

In accordance with a concomitant feature of the invention, there is provided a gear-shift-strategy-defining circuit having an input that is connected to the transmission controller and an output that is connected to the superordinate controller.

Some advantages of the invention are, in particular, that all of the gear-shift operations are carried out promptly and without jolting, and that the expenditure necessary for this is low.

Other features which are considered as characteristic for the invention are set forth in the appended claims.

Although the invention is illustrated and described herein as embodied in Method for controlling a motor vehicle drive and motor vehicle drive controlled using said method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 6 shows an interface of the controller shown in FIG. 2;

FIGS. 7 and 8 show the variation over time of the clutch position during different controlling operations;

FIG. 13 shows a flowchart of a program that is executed during the method for controlling the motor vehicle drive.

DESCRIPTION OF THE PREFERRED EMBODIMENTS

Figure 1:
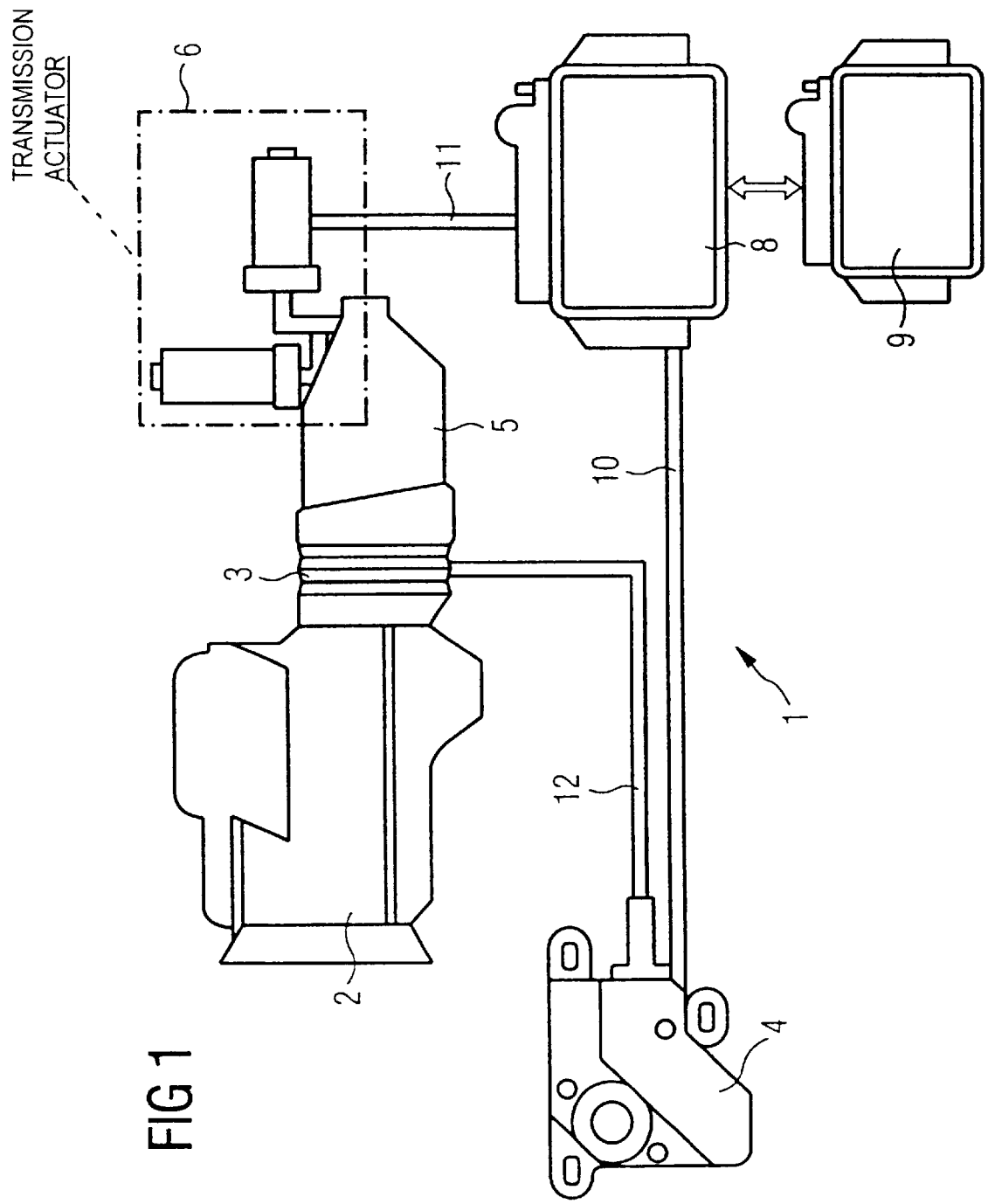
FIG. 1 shows a motor vehicle drive with an automated transmission.

Referring now to the figures of the drawing in detail and first, particularly, to FIG. 1 thereof, there is shown a motor vehicle drive 1 that has—insofar as it is significant for the present invention—the following components: an engine 2, a clutch 3, a clutch actuator 4, a transmission 5, a transmission actuator 6, and an electronic transmission control unit 8 for the clutch actuator 4 and for the transmission actuator 6. The motor vehicle drive 1 also has an engine controller 9. The electronic transmission control unit 8 is connected to the clutch actuator 4 by control and signal lines 10, and to the transmission actuator 6 by control and signal lines 11.

The clutch actuator 4 can be embodied as an electromotively driven or hydraulically driven actuator. In the exemplary embodiment described here, a hydraulic clutch actuator 4 is used which is connected to the clutch 3 by a force transmission arrangement 12 which can be embodied for example as a pressure line.

In the motor vehicle drive 1, the transmission 5 is embodied in the present exemplary embodiment as a conventional manually shifted transmission. The clutch 3 is activated automatically here—under the control of the electronic transmission control unit 8—as soon as the driver manually operates the gear-shift lever (not illustrated here) in order to carry out a gear-shift operation. Such a transmission is referred to as an automatic (or also automated) manually shifted transmission ASG. The motor vehicle drive according to the invention can, however, also be implemented with a fully automatic transmission.

Figure 2:
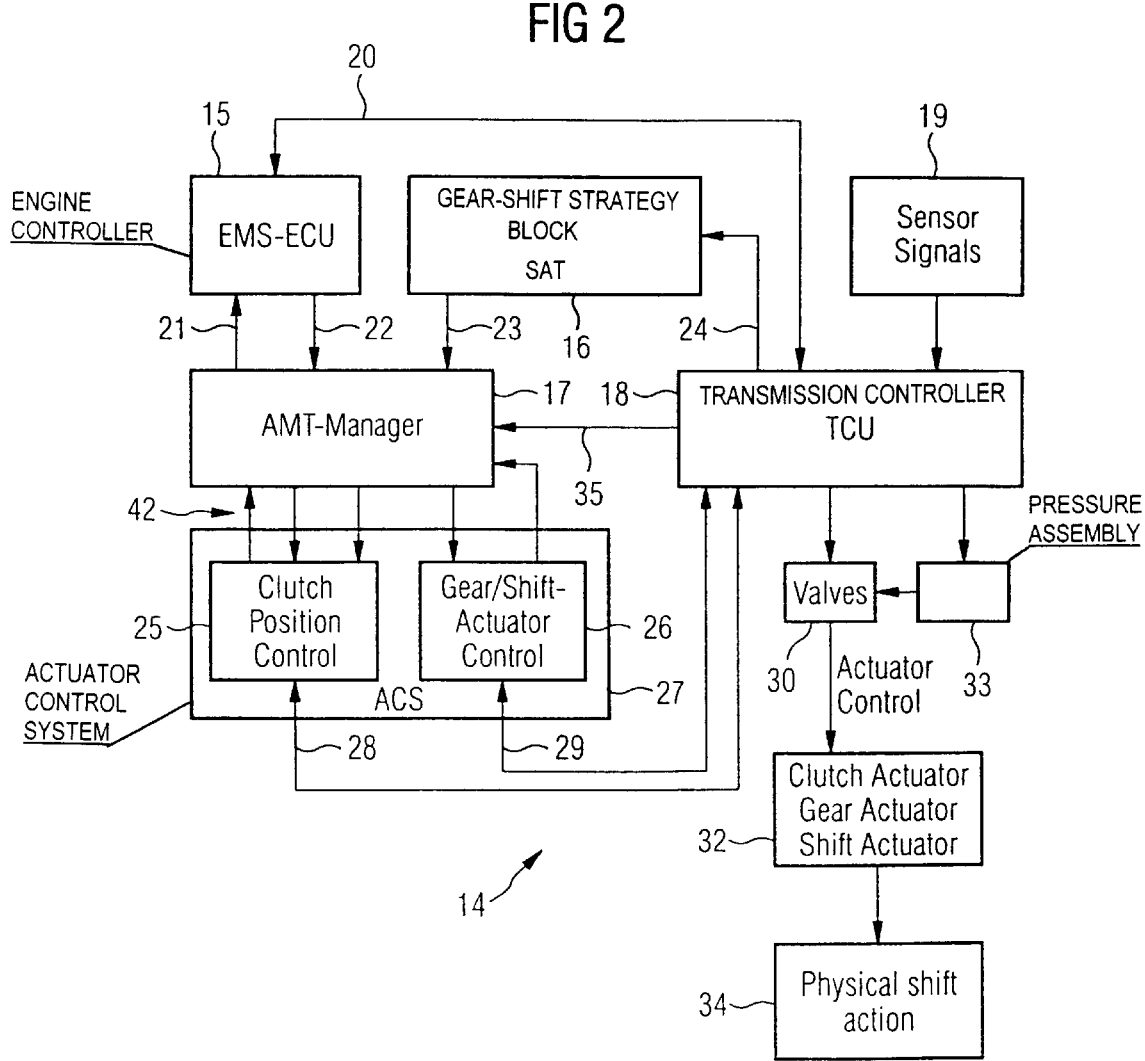
FIG. 2 shows a block diagram of the drive controller of a motor vehicle drive according to FIG. 1, including hardware, software and functional components.

FIG. 2 is a block diagram of a drive controller 14 or an overall controller, of the motor vehicle drive 1, that includes an engine controller 15, a gear-shift-strategy-defining circuit or gear-shift strategy block (SAT) 16, a superordinate controller (AMT manager) 17 and a transmission controller (TCU) 18, which are connected to one another by data and signal lines (referred to below as lines) 20–24. Sensors 19 supply the transmission controller 18 with measured values of positions, rotational speeds and pressures that are in the drive controller 14. Some of the lines 20–24 are implemented as a CAN (Controller Area Network) bus. Data is exchanged between the blocks 15 and 18 via the CAN bus 20. Torque requests and rotational speed requests are transmitted from the AMT manager 17 to the engine controller 15 via the CAN bus 21. The AMT manager 17 is connected to a clutch position controller 25 and a transmission actuator controller 26 by an efficient interface (42) that will be later described with reference to FIG. 6.

The clutch status and the aimed-at setting (or the set point value) of the clutch 3 is transmitted from the AMT manager 17 via the lines of the interface 42 to the clutch position controller 25, and the aimed-at gear speed is transmitted to the transmission actuator controller 26. The actual position is transmitted from the clutch position controller 25 to the AMT manager 17, and the gear-shift or the status or transmission status is transmitted from the transmission actuator controller 26.

The gear-shift strategy block 16 has an input that is connected to the transmission controller 18 and an output that is connected to the superordinate controller or AMT manager 17. The transmission controller 18 contains hardware interface circuits and a BIOS/VIOS (Basic Input/Output System)/(Virtual Input/Output System) operating system. The abbreviations which are placed in front of the individual diagram components or blocks in brackets are designations which are used in program descriptions of the motor vehicle drive. They are also used below for the sake of simplicity.

The AMT manager 17 coordinates the activities of the drive controller 14 of the motor vehicle drive 1 for various travel situations, such as starting up, shifting gear, stopping or crawling. It requests the rotational speeds and/or torques necessary for a specific operating state from the engine controller 15 via the line 21. A gear-shift request is conveyed to the AMT manager 17 by an automatic gear-shift-time-determining function (not explained here in more detail) or by the driver via a mechanical toggle switch. After checking safety and plausibility functions, this gear-shift request is passed on, to the clutch position controller 25 and to the transmission actuator controller 26, which are connected to the transmission controller 18 via data lines 28 and 29. The clutch position controller 25 and the transmission actuator controller 26 together form an actuator control system (ACS) 27.

The clutch position controller 25 and the transmission actuator controller 26 then coordinate the gear-shift operation by requesting, under phase control, control currents for electrohydraulic valves 30 from the transmission controller 18. Such control currents are referred to as valve currents. The valves 30 control hydraulic pressures which activate the clutch and the transmission actuators which are combined in FIG. 2 to form an actuator block 32.

The clutch position controller 25 and the transmission actuator controller 26 also monitor the actuator position changes which are brought about by the control currents for the valves 30. The hydraulic pressure that is influenced by the valves 30 is generated in a pressure assembly 33 which is controlled by the transmission controller 18. The actuators of the block 32 bring about a gear-shift operation by activating gear-shift elements (for example a gear-shift sleeve), not illustrated here, that are in the transmission 5, with a time sequence which will be described below. The actual gear-shift operation in the transmission is illustrated by a block 34.

The clutch position is controlled in an analogous fashion. The AMT manager 17 calculates the necessary clutch position and passes on the set point value to the clutch position controller 25. Furthermore, what is referred to as to the clutch status (for example, the clutch is closed, open, blocked, . . . ) is then determined. This status depends on the contact point (also referred to as touch point) of the clutch 3. This corresponds to the particular clutch position at which torque begins to be transmitted from the engine to the transmission input shaft.

Figure 3:
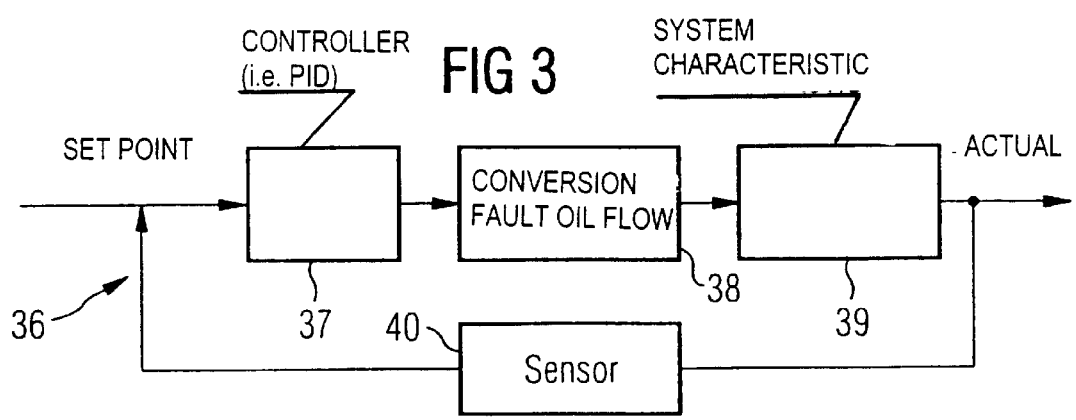
FIG. 3 shows a clutch position control loop of the controller shown in FIG. 2.

A control loop 37 for the clutch position 36 (FIG. 3) contains a controller 37 which corresponds to the clutch position controller 25 shown in FIG. 2 and which is embodied, for example, as a PID controller. At its input there is a set point value SETPOINT of the clutch position, and its output signal is fed to a converter 38. The converter 38 converts a value which is generated in the controller and which is obtained from the deviation of the clutch position, into a setting value for the oil flow via the associated electrohydraulic valve 30. The setting value brings about an actual value ACTUAL of the clutch position in a controlled system 39, taking into account the system characteristic, which actual value ACTUAL is sensed by a sensor 40 and fed back as a measurement signal to the input of the controller 37, where the difference the actual value ACTUAL minus the set point value SETPOINT is calculated in a known fashion.

The quality of a control operation can be described by means of various requests, some of which are contradictory. The most important criteria for controlling the present motor vehicle drive will now be explained with reference to the diagrams in FIGS. 4 to 5.

Figure 4:
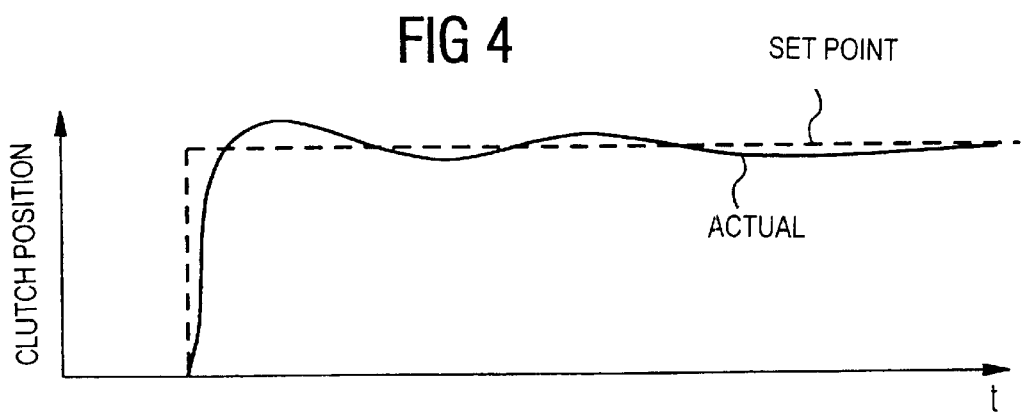
FIGS. 4 and 5 show two diagrams explaining regulation of the clutch position.

In FIG. 4, the jump response of the clutch position actual value ACTUAL to a higher jump in the clutch position set point value SETPOINT is illustrated, i.e. to a jump which, for example, is greater than 10% of the overall travel of the clutch. The important factors for the quality of a control operation are its speed, degree of overshoot, ripple content of the transient response and the static precision of the position.

Figure 5:
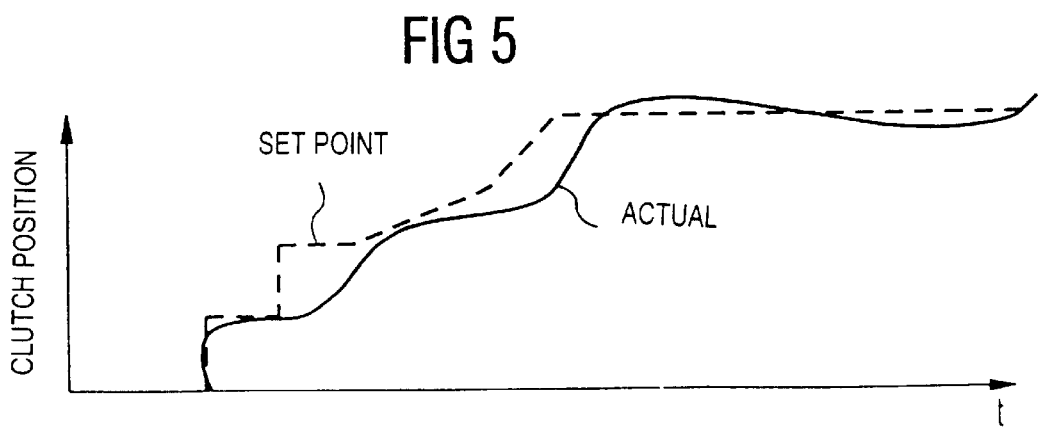

FIG. 5 illustrates a typical control operation of the clutch position: it points to a plurality of small jumps, a plurality of rising straight sections with various positive gradients and a steady-state final value.

It has become a fact that precise conversion of the set point value prescribed by the AMT manager 17 for the clutch position by the clutch position controller 25 constitutes one of the most important requirements of a high-quality automated transmission. The main quality criteria are that during gear-shift operations of the transmission there is only a very short interruption in the traction force and that the vehicle jolts as far as possible only to an imperceptible degree.

The desired quality of the motor vehicle drive 1 during the gear-shifting operation is achieved with an interface 42 (shown in FIG. 6) that is between the AMT manager 17 and the clutch position controller 25 via which the following information or data is exchanged: the AMT manager 17 transmits the clutch target position or set point value to the clutch position controller 25 via a signal line 43. Via a signal line 44, it transmits requests relating to the dynamics of the control loop in terms of speed, overshoot characteristics, static precision and ripple content. The clutch position controller 25 then determines suitable controller parameters as a function of these prescribed values. The clutch position controller 25 itself transmits the actual clutch position, i.e. its actual value, to the AMT manager 17 via a signal line 46.

After the control operation, the clutch position controller 25 receives feedback on the control quality from the AMT manager 17. The clutch position controller 25 analyzes this feedback and thus improves its control quality for the next similar control operation by changing the control parameters. The connection of the AMT manager 17 to other interfaces that are shown in FIG. 2 is indicated with a dashed signal line 48.

The advantage of the interface 42 is, in particular, the fact that the clutch position controller is adapted individually to different travel situations in a dynamic fashion, and is thus continuously optimized. This will now be explained in detail with reference to FIGS. 7 and 8.

The AMT manager 17 prescribes a relatively large jump in the clutch position (FIG. 7) and requests a very rapid control operation. The clutch position controller 25 reaches the target position very quickly, but overshoots it. The AMT manager then detects that the overshoot has very severely degraded the gear-shift quality. This is detected by analyzing various variables of the entire system of the automated transmission. For example, an overshoot when approaching the clutch touch point would have resulted in a sudden drop in the engine speed. The AMT manager 17 then adapts the control operation in conjunction with the clutch position controller 25 so that a control profile such as is illustrated in FIG. 8 is thus obtained. Various engagement conditions are transmitted to the clutch position controller 25 by the AMT manager 17.

Figure 9:
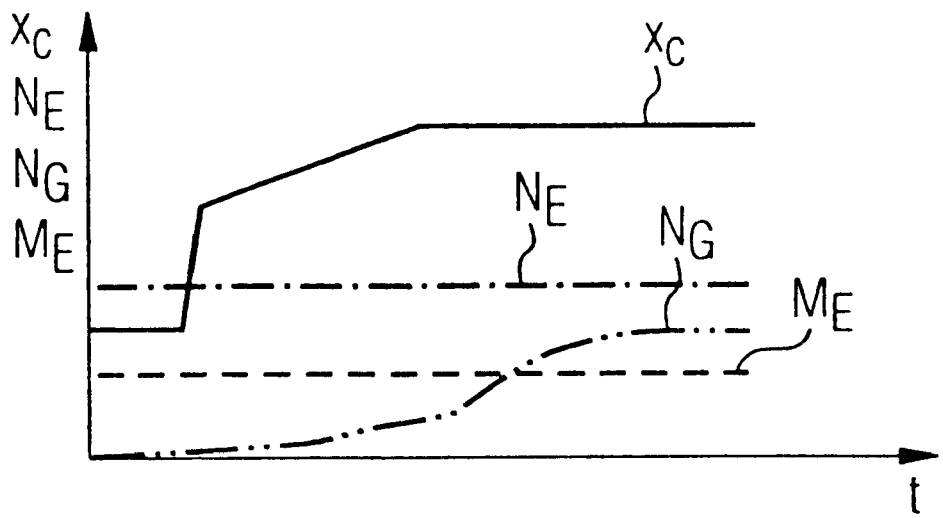
FIGS. 9 to 12 show the variation over time of the clutch position, the engine speed, the transmission speed and the engine torque for different methods of operation of the motor vehicle drive shown in FIG. 1.

FIG. 9 shows a control operation for the clutch position when crawling, i.e. the motor vehicle is traveling very slowly. The variation over time t of the clutch position xc, the engine speed NE, the transmission speed NG and the engine torque ME are plotted. When there is a jump into a "crawling" modulus of a control program, a clutch jump to the vicinity of the contact point (or touch point) is prescribed: a moderate degree of dynamics (referred to below as priority 2) is necessary here, the maximum priority (referred to below as priority 1) is given to the avoidance of overshoots. A high degree of steady-state precision (priority 1) of the clutch position control is then necessary.

Figure 10:
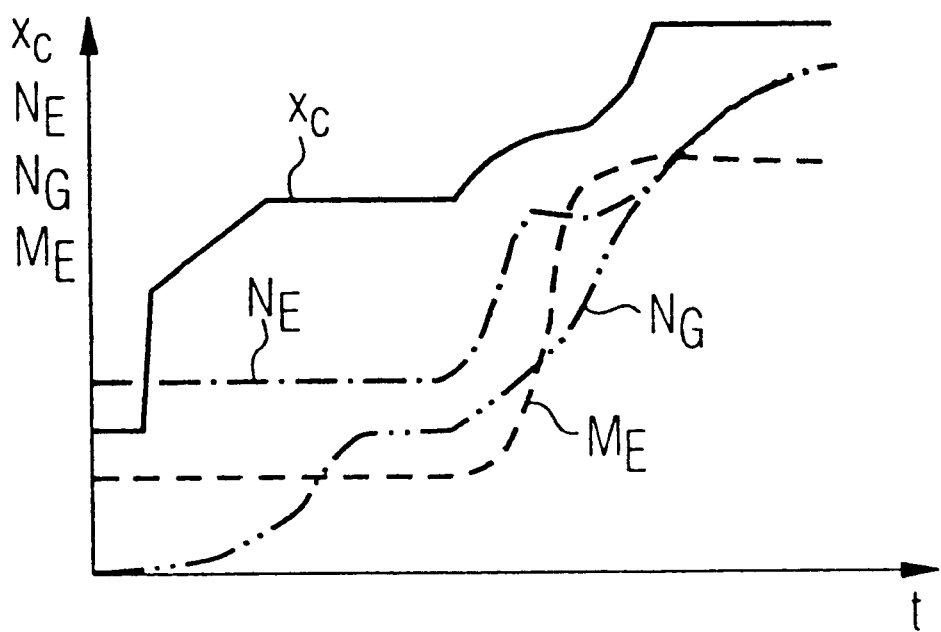

FIG. 10 shows a control operation of the clutch position when the motor vehicle is starting up. The variation over time of the same variables as those shown in FIG. 9 is plotted. The following conditions apply here: During normal starting up—a low level of dynamics (priority 3), and steady-state precision (priority 1). During rapid starting up—a moderate level of dynamics (priority 2), and no overshoots (priority 2).

Figure 11:
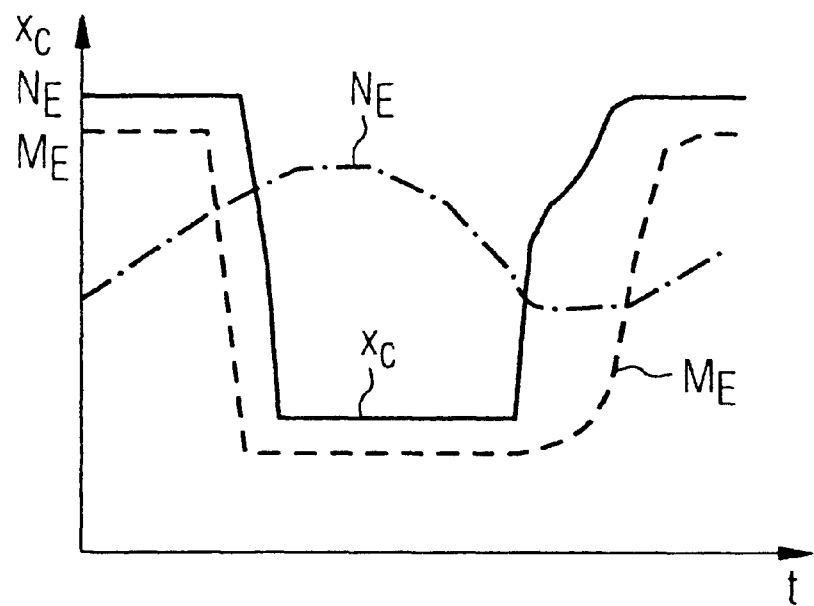
Figure 12:
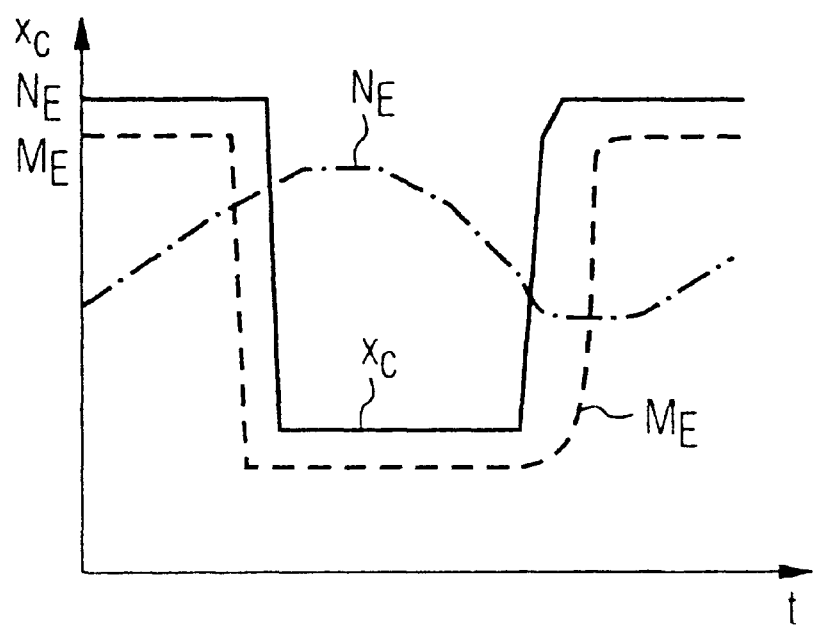

FIG. 11 shows a slow gear-shift operation and FIG. 12 shows a rapid gear-shift operation. The variation over time of the same variables as those shown in FIG. 9 is plotted. The conditions are as follows:

A. When engagement occurs at the end of the gear-shift operation:

1st phase, jump to the vicinity of the contact point: high level dynamics (priority 1), no overshoots (priority 2);

2nd phase, clutch control by controlling the rotational speed with large control errors: high level of dynamics (priority 1), no overshoots (priority 2);

3rd phase, clutch control by controlling the rotational speed with small control errors, moderate level of dynamics (priority 2), no overshoots (priority 1); and 4th phase, closing of the clutch after a reduction of the slip over a time ramp: high level of dynamics (priority 1).

B. When disengagement occurs at the start of the gear-shift sequence:

1st phase, opening the clutch as far as the vicinity of the contact point: high level of dynamics (priority 1–2), no overshoots (small to medium jumps, priority 1); and 2nd phase, completely opening the clutch: high level of dynamics (priority 1).

The program, which is shown in the sequence diagram in FIG. 13, and is executed during the method according to the invention has the following steps S1 to S12:

S1: The travel situation is detected, i.e. it is determined whether a starting up operation, a gear-shift operation, or an emergency travel function, etc. takes place. This is then followed, in a first program branch, by the steps:

S2: The transmission controller calculates the target gear speed (set point value);

S3: The target gear speed is transmitted to the program/gear speed actuator interface; and S4: The target gear speed is fed to the control program for the gear speed actuator and thereby brings about a new actual setting of the gear speed actuator. This is followed by a jump back to step S1.

The following steps occur in three parallel branches:

S5: The target position for the clutch is determined;

S6: The priorities of the requests to the clutch actuator controllers are defined;

S7: The feedback on the quality of the position control operations is taken into account when defining the priorities;

S8: The results of steps S5 to S7 are transmitted to the program/clutch actuator interface; and S9: The results of the steps S5 to S7 are fed to the control program for the clutch actuator, and controller parameters, which correspond to the defined priorities, are selected. In this way, a new actual position of the clutch is brought about and there is a return jump to step S1.

The following steps occur in a further parallel branch:

S10: The target torque of the engine (or the target torque at the clutch) is determined;

S11: The target torque is transmitted to the program/engine controller interface. In this way, S12: a new actual torque of the engine is brought about and there is a return jump to the step S1.

A program cycle is then terminated, and the program is executed again from the start.

Furthermore, it is also possible that, for various clutch-engagement conditions, the AMT manager 17 transmits only the priorities for, for example, the dynamics, steady-state precision and overshoot characteristics to the actuator control system (ACS) 27.

A feedback from the AMT manager to the actuator control system 27 can be used for a self-learning process for the drive controller 14.

A "temporary" correction (interference variable) of the controller parameters for the corresponding prioritization is also possible. In this way, it is possible, if the dynamics have been too low, for example, when there is feedback of the AMT manager 17, to carry out an intentionally excessively high control operation over a predefined time period with a predefined reduction over time before subsequently using the corrected (not excessively high) value. For this period, renewed learning of the parameters is then not permitted, in order to avoid overshoot characteristics due to incorrect learning.

We claim:

1. A method for controlling a motor vehicle drive, which comprises:

providing a motor vehicle drive having an automatically activated clutch, an automatic transmission, a transmission actuator, and an electronic drive controller;

providing control signals that are used to set a set point of the clutch;

through an interface, transmitting the control signals from a superordinate controller to a subordinate position controller for the clutch;

through the interface, transmitting an actual position signal from the subordinate position controller to the superordinate controller;

providing a feedback message that is used to optimize a controlling quality as a function of a respective travel situation; and through the interface, transmitting the feedback message from the superordinate controller to the subordinate position controller.

2. The method according to claim 1, which comprises individually adapting a control operation for a clutch position of a clutch to the respective travel situation in a dynamic fashion.

3. The method according to claim 1, which comprises defining different priorities for dynamics of a controlling operation as a result of optimizing the controlling quantity.

4. The method according to claim 1, which comprises defining different priorities for a steady-state precision of a controlling operation as a result of optimizing the controlling quantity.

5. The method according to claim 1, which comprises defining a permitted magnitude of controlling overshoots as a result of optimizing the controlling quantity.

6. The method according to claim 1, which comprises using the superordinate controller to coordinate control operations of the motor vehicle drive for predefined travel situations.

7. A motor vehicle drive, comprising:

an automatically activated clutch;

an automatic transmission;

a transmission actuator;

an electronic drive controller that includes a superordinate controller and a subordinate position controller for said clutch; and an interface that is provided between said superordinate controller and said subordinate position controller;

said interface for exchanging control signals and status signals that are used to optimize a controlling quality as a function of a respective travel situation.

8. The motor vehicle drive according to claim 7, comprising:

an actuator control system that is connected to said superordinate controller by said interface;

a transmission controller; and data lines connecting said actuator control system to said transmission controller.

9. The motor vehicle drive according to claim 7, comprising a gear-shift-strategy-defining circuit having an input that is connected to said transmission controller and an output that is connected to said superordinate controller.

* * * * *